(12) United States Patent
Kucherov et al.

(10) Patent No.: US 11,030,314 B2
(45) Date of Patent: Jun. 8, 2021

(54) STORAGE SYSTEM WITH SNAPSHOT-BASED DETECTION AND REMEDIATION OF RANSOMWARE ATTACKS

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 270 days.

(21) Appl. No.: 16/050,167

(22) Filed: Jul. 31, 2018

(65) Prior Publication Data

US 2020/0042707 A1     Feb. 6, 2020

(51) Int. Cl.
  *G06F 21/56*     (2013.01)
  *G06F 3/06*     (2006.01)

(52) U.S. Cl.
  CPC .......... *G06F 21/566* (2013.01); *G06F 3/0622* (2013.01); *G06F 3/0637* (2013.01); *G06F 3/0683* (2013.01); *G06F 2221/034* (2013.01)

(58) Field of Classification Search
  CPC .... G06F 21/566; G06F 3/0622; G06F 3/0683; G06F 3/0637; G06F 2221/034; G06F 21/554
  See application file for complete search history.

(56) References Cited

U.S. PATENT DOCUMENTS 7,444,464 B2   10/2008  Urmston et al.
8,095,726 B1   1/2012  O'Connell et al.
(Continued)

FOREIGN PATENT DOCUMENTS

| EP | 3038003 A1 | 6/2016 |
| GB | 2534459 A | 7/2016 |
| WO | 2016111954 A1 | 7/2016 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Saleh Najjar
*Assistant Examiner* — Nhan Huu Nguyen
(74) *Attorney, Agent, or Firm* — Ryan, Mason & Lewis, LLP

(57) ABSTRACT

A storage system in one embodiment comprises a plurality of storage devices and a storage controller. The storage controller is configured to generate a plurality of snapshots of a storage volume of the storage system at respective different points in time, to monitor a differential between a given one of the snapshots and the storage volume, and to generate an alert indicative of at least a potential ransomware attack on the storage system based at least in part on the monitored differential satisfying one or more specified conditions. The one or more specified conditions illustratively comprise a specified minimum amount of change in the storage volume relative to the given snapshot of the storage volume. Compressibility of the storage volume is also taken into account in generating the alert in some embodiments. The storage controller illustratively initiates restoration of the storage volume utilizing a selected snapshot responsive to confirmation of an actual attack.

20 Claims, 6 Drawing Sheets

MULTIPLE SNAPSHOTS GENERATED OVER TIME FOR A GIVEN STORAGE VOLUME

(56) References Cited

U.S. PATENT DOCUMENTS

| | | | |
|---|---|---|---|
| 8,214,612 B1 | 7/2012 | Natanzon | |
| 9,104,326 B2 | 8/2015 | Frank et al. | |
| 9,197,663 B1* | 11/2015 | Gilbert | H04W 12/0023 |
| 9,208,162 B1 | 12/2015 | Hallak et al. | |
| 9,286,003 B1 | 3/2016 | Hallak et al. | |
| 9,317,686 B1* | 4/2016 | Ye | G06F 11/1448 |
| 9,483,644 B1* | 11/2016 | Paithane | G06F 21/566 |
| 9,606,870 B1 | 3/2017 | Meiri et al. | |
| 9,716,754 B2 | 7/2017 | Swift | |
| 9,813,443 B1* | 11/2017 | Subramanian | G06F 21/561 |
| 10,229,269 B1* | 3/2019 | Patton | G06F 21/566 |
| 10,552,610 B1* | 2/2020 | Vashisht | G06F 3/0623 |
| 2007/0100905 A1* | 5/2007 | Masters | G06F 21/568 |
| 2007/0240219 A1* | 10/2007 | Tuvell | G06F 21/56 726/24 |
| 2008/0016570 A1 | 1/2008 | Capalik | |
| 2008/0168135 A1* | 7/2008 | Redlich | G06F 21/6218 709/204 |
| 2008/0279462 A1 | 11/2008 | Celi, Jr. | |
| 2009/0132955 A1 | 5/2009 | Garg et al. | |
| 2009/0144823 A1 | 6/2009 | Lamastra et al. | |
| 2009/0210943 A1* | 8/2009 | Alon | G06F 21/563 726/24 |
| 2010/0179941 A1* | 7/2010 | Agrawal | G06F 11/1451 707/624 |
| 2012/0016842 A1* | 1/2012 | Furuya | G06F 16/128 707/649 |
| 2013/0247196 A1* | 9/2013 | Brando | G06F 9/44536 726/23 |
| 2013/0325824 A1 | 12/2013 | Shoens | |
| 2014/0181016 A1 | 6/2014 | Whitehead et al. | |
| 2015/0100750 A1* | 4/2015 | Cashman | G06F 3/0665 711/170 |
| 2016/0127200 A1* | 5/2016 | Dippenaar | H04L 41/5009 709/224 |
| 2016/0150012 A1 | 5/2016 | Barszczak et al. | |
| 2016/0164894 A1 | 6/2016 | Zeitlin et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2016/0378988 A1* | 12/2016 | Bhashkar | G06F 21/568 726/24 |
| 2017/0140156 A1* | 5/2017 | Gu | G06F 21/566 |
| 2017/0192857 A1 | 7/2017 | Meiri et al. | |
| 2017/0357465 A1* | 12/2017 | Dzeryn | G06F 9/485 |
| 2017/0364681 A1* | 12/2017 | Roguine | G06F 21/568 |
| 2017/0366563 A1* | 12/2017 | Volfman | H04L 63/1491 |
| 2018/0107824 A1* | 4/2018 | Gibbons, Jr. | G06F 21/565 |
| 2018/0211038 A1* | 7/2018 | Breiman | H04L 63/145 |
| 2018/0211039 A1* | 7/2018 | Tamir | G06F 16/128 |
| 2018/0218153 A1* | 8/2018 | Edwards | G06F 21/566 |
| 2018/0322281 A1* | 11/2018 | Borlick | G06F 21/562 |
| 2018/0330088 A1* | 11/2018 | Crofton | G06F 16/113 |
| 2019/0109870 A1* | 4/2019 | Bedhapudi | H04L 63/0428 |
| 2019/0235973 A1* | 8/2019 | Brewer | G06F 21/568 |
| 2020/0034537 A1* | 1/2020 | Chen | G06F 16/128 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "Emc Recoverpoint Replication of XtremIO: Understanding the Essentials of RecoverPoint Snap-Based Replication for XtremIO," EMC White Paper, Aug. 2015, 31 pages.

N. Scaife et al., "CryptoLock (and Drop It): Stopping Ransomware Attacks on User Data," 36th International Conference on Distributed Computing Systems, Mar. 12, 2016, pp. 303-312 Takabatake-cho, Nara, Japan.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 15/360,398 filed in the name of Misha Nossik et al. Nov. 23, 2016 and entitled "Automated Detection and Remediation of Ransomware Attacks Involving a Storage Device of a Computer Network."

U.S. Appl. No. 15/268,862 filed in the name of James L. Weaver et al. Sep. 19, 2016 and entitled "Automated Detection and Remediation of Ransomware Attacks Involving a Storage Device of a Computer Network."

* cited by examiner

STORAGE SYSTEM WITH SNAPSHOT-BASED DETECTION AND REMEDIATION OF RANSOMWARE ATTACKS

FIELD

The field relates generally to information processing systems, and more particularly to storage in information processing systems.

BACKGROUND

An information processing system is typically configured to incorporate security functionality in order to protect the computers, servers and other processing devices of the system against malicious activity. Such malicious activity can include, for example, ransomware attacks in which malware infecting one or more processing devices of the system will systematically encrypt files on an associated storage array or other type of storage system. The attacker withholds the corresponding decryption key unless a ransom is paid by the victim. Conventional techniques for combatting ransomware attacks can be problematic in that such techniques can take an unduly long amount of time to detect an attack in progress. The longer it takes to detect the attack, the greater the number of files that are encrypted, and the greater the adverse impact of the attack on the victim.

SUMMARY

Illustrative embodiments of the invention provide techniques for snapshot-based detection and remediation of ransomware attacks on a storage array or other type of storage system. For example, some embodiments are configured to provide particularly accurate and efficient detection of on-going ransomware attacks directly on a storage array or other type of storage system through monitoring of differentials between snapshots and respective sets of one or more storage volumes of that storage system. These embodiments can also facilitate automated ransomware attack remediation through selection of a particular one of the snapshots for use in data recovery responsive to detection of an actual attack.

These embodiments illustratively include a clustered implementation of a content addressable storage system having a distributed storage controller. Similar advantages can be provided in other types of storage systems.

In one embodiment, a storage system comprises a plurality of storage devices and a storage controller. The storage controller is configured to generate a plurality of snapshots of a storage volume of the storage system at respective different points in time, to monitor a differential between a given one of the snapshots and the storage volume, and to generate an alert indicative of at least a potential ransomware attack on the storage system based at least in part on the monitored differential satisfying one or more specified conditions.

The storage volume illustratively comprises at least one logical storage volume comprising at least a portion of a physical storage space of one or more of the storage devices. The term "storage volume" as used herein is therefore intended to be broadly construed, so as to encompass a set of one or more logical storage volumes.

The plurality of snapshots illustratively comprise respective point-in-time (PIT) replicas of the storage volume generated at respective different points in time.

The one or more specified conditions in some embodiments comprise a specified minimum amount of change in the storage volume relative to the given snapshot of the storage volume. For example, the specified minimum amount of change in the storage volume is illustratively specified in terms of at least one of a minimum number of storage units of the storage volume that have changed since generation of the given snapshot, and a minimum percentage of the storage volume that has changed since generation of the given snapshot.

The alert indicative of at least a potential ransomware attack on the storage system may comprise an alert of a potential ransomware attack, an alert of an actual ransomware attack, or both such alerts separated in time from one another.

In some embodiments, generating an alert indicative of at least a potential ransomware attack on the storage system based at least in part on the monitored differential satisfying one or more specified conditions comprises determining that the monitored differential satisfies the one or more specified conditions, determining compressibility of at least a portion of the storage volume, and generating the alert responsive to the monitored differential satisfying the one or more specified conditions and the compressibility of the storage volume being below a specified level of compressibility.

The storage controller is illustratively configured to generate a message containing the generated alert of at least a potential ransomware attack and to deliver the message over a network to a storage administrator device.

The storage controller in some embodiments is configured to generate an alert of a potential ransomware attack and to initiate one or more attack remediation operations responsive to confirmation of the potential ransomware attack as an actual ransomware attack.

Such remediation operations in illustrative embodiments comprise initiating restoration of the storage volume utilizing a selected one of the plurality of snapshots generated prior to the given snapshot.

Additionally or alternatively, the storage controller is illustratively configured to control deletion of one or more of the snapshots from the storage system based at least in part on the generated alert.

For example, the storage controller in some embodiments is configured to determine that the generated alert is a false positive and to delete one or more of the snapshots from the storage system based at least in part on the false positive determination.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
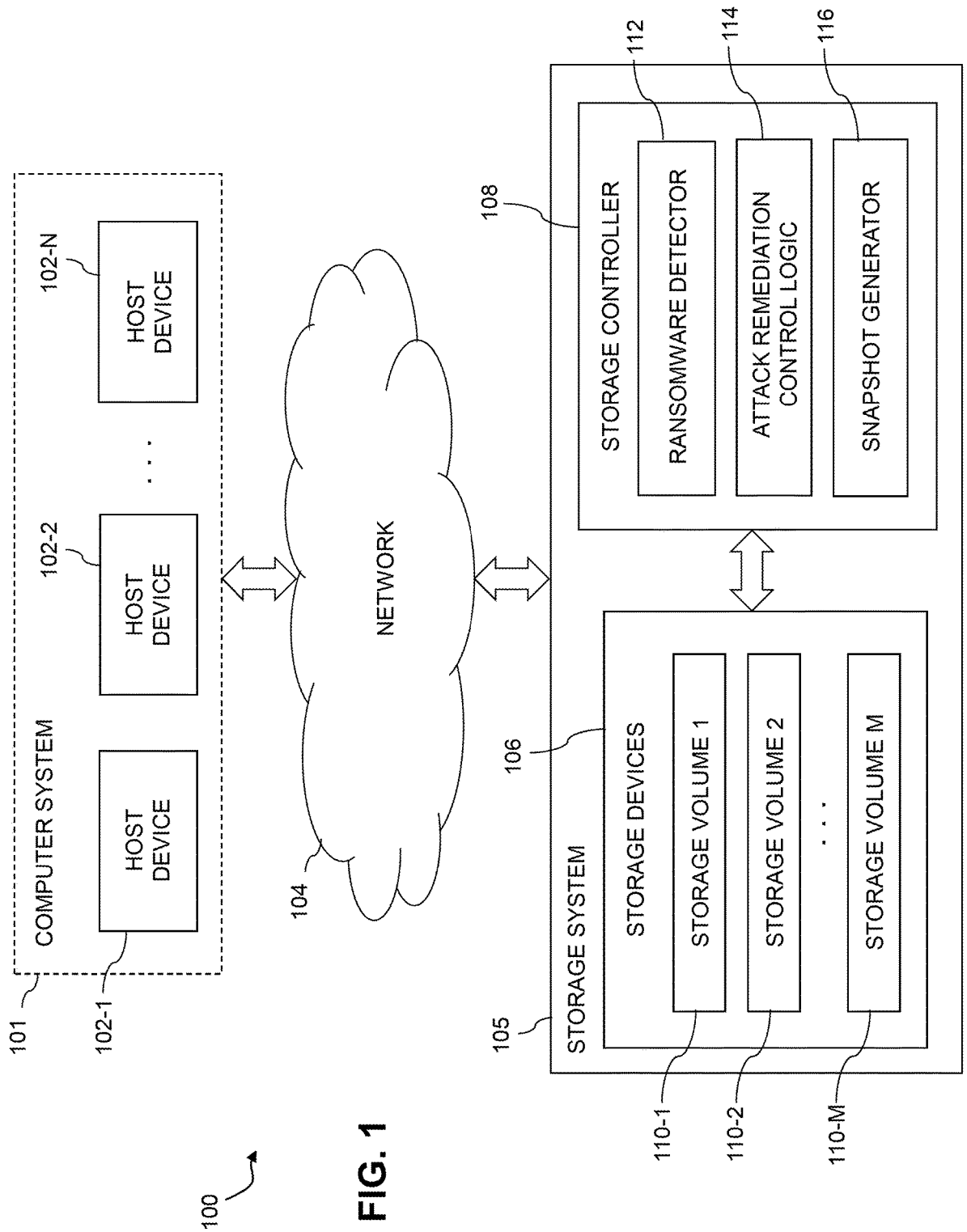
FIG. 1 is a block diagram of an information processing system comprising a storage system configured with functionality for snapshot-based detection and remediation of ransomware attacks in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store storage volumes 110-1, 110-2, . . . 110-M. The storage volumes 110 illustratively comprise respective logical units (LUNs) or other types of logical storage volumes.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes a ransomware detector 112, attack remediation control logic 114 and a snapshot generator 116. The ransomware detector 112 is configured to control performance of at least portions of a snapshot-based ransomware detection and remediation process such as that illustrated in the flow diagram of FIG. 2, operating in conjunction with the attack remediation control logic 114 and the snapshot generator 116.

The storage controller 108 and storage system 105 should also be understood to include additional modules and other components typically found in conventional implementations of storage controllers and storage systems, although such additional modules and other components are omitted from the figure for clarity and simplicity of illustration.

The storage controller 108 via its ransomware detector 112, attack remediation control logic 114 and snapshot generator 116 is configured to generate a plurality of snapshots of at least a designated one of the storage volumes 110 of the storage system 105 at respective different points in time, to monitor a differential between a given one of the snapshots and the storage volume, and to generate an alert indicative of at least a potential ransomware attack on the storage system 105 based at least in part on the monitored differential satisfying one or more specified conditions. The given one of the snapshots is illustratively the newest snapshot in a sequence of snapshots generated over time. However, other embodiments can utilize snapshots that are in different relative sequential positions.

An example of such a sequence of snapshots will be described in more detail below in conjunction with FIG. 3. At least a subset of the snapshots illustratively comprise respective PIT replicas of the designated storage volume generated by the snapshot generator 116 at respective different points in time.

A given storage volume designated for snapshot-based detection and remediation of ransomware attacks in the storage system 105 illustratively comprises a set of one or more LUNs or other instances of the storage volumes 110 of the storage system 105. Each such LUN or other storage volume illustratively comprises at least a portion of a physical storage space of one or more of the storage devices 106.

The storage system 105 is illustratively configured to store the snapshots for the storage volume in a tree structure in which the snapshots are designated as collectively comprising a snapshot group. The term "snapshot group" as used herein is intended to be broadly construed so as to encompass a set of snapshots generated over time for a particular storage volume or set of storage volumes. Individual snapshots of the snapshot group illustratively correspond to respective PIT replicas of the storage volume or set of storage volumes.

A given such tree structure illustratively stores at least one snapshot group comprising a plurality of snapshots having parent-child relationships and other types of ancestor relationships. For example, a given snapshot may be designated as a child snapshot of the snapshot group in the tree structure relative to a previous snapshot which is designated as a parent snapshot of the snapshot group in the tree structure.

In some embodiments, the tree structure utilized to store the snapshots for a snapshot group comprises a snapshot tree constructed for the storage volume.

Other types of tree structures implemented using a wide variety of alternative data structures such as tables can be used to store information characterizing snapshots of a snapshot group in other embodiments.

The one or more specified conditions utilized in controlling generation of the alert in the storage controller 108 illustratively comprise a specified minimum amount of change in the storage volume relative to the given snapshot of the storage volume. For example, the specified minimum amount of change in the storage volume can be specified in terms of at least one of a minimum number of storage units of the storage volume that have changed since generation of the given snapshot, and a minimum percentage of the storage volume that has changed since generation of the given snapshot. The term "storage units" in this example refers to a measure of storage capacity, such as megabytes (MB) or gigabytes (GB), although other similar storage units can be used.

In some embodiments, monitoring the differential between the storage volume of the storage system 105 and the given snapshot generated for that storage volume comprises maintaining a corresponding counter indicative of an amount of data in the storage volume that has been written since generation of the given snapshot. The counter is illustratively one of a plurality of storage volume counters maintained for respective ones of the storage volumes 110. The storage volume counters are maintained in a memory of the storage system 105 under the control of the ransomware detector 112.

In an embodiment of this type, generating the alert responsive to the monitored differential satisfying one or more specified conditions illustratively comprises generating the alert responsive to the counter exceeding a specified threshold. The counter is reset in conjunction with the generation of a subsequent snapshot. Other arrangements of two or more counters that can be used to detect unusually large amounts of changes to the storage volume since generation of a given snapshot can also be used.

For example, in other embodiments, monitoring the differential between the storage volume of the storage system 105 and the given snapshot generated for that storage volume comprises maintaining a first counter indicative of a total amount of data in the storage volume, maintaining a second counter indicative of an amount of data in the storage volume that has been written since generation of the given snapshot, and monitoring values of the first and second counters.

In an embodiment of this type, the monitored differential satisfying one or more specified conditions illustratively comprises the value of the second counter satisfying a specified condition relative to the value of the first counter, such as the value of the second counter reaching a specified percentage of the value of the first counter. The second counter is illustratively reset in conjunction with the generation of the subsequent snapshot. In some cases, one or more of the counters may be maintained in manner that ignores repeated overwrites to the same pages of the storage volume, possibly using an address-to-hash ("A2H") structure for the storage volume, where the A2H structure illustratively comprises at least a portion of an A2H tree including logical addresses for respective pages of the storage volume in association with respective content-based signatures of those pages, as well as additional fields, such as an "old data" field that can be used to determine if a given write to a particular address is a first write to that address since generation of a given snapshot.

The content-based signatures illustratively comprise hash digests of their respective pages, each generated by application of a hash function such as the well-known Secure Hashing Algorithm 1 (SHA1) to the content of its corresponding page. It is also possible that other types of content-based signatures may be used, such as hash handles of the type described elsewhere herein. A given content-based signature in illustrative embodiments is unique to the particular content of the page from which it is generated, such that two pages with exactly the same content will have the same content-based signature, while two pages with different content will have different content-based signatures.

As a more particular example of a two-counter embodiment, the first counter specifies the total amount of data in the storage volume (e.g., in bytes, or in pages), and the second counter specifies the total amount of data written since the most recent snapshot. In one possible implementation, the second counter is used to determine when to generate an alert of at least a potential attack, and a snapshot-based detection and remediation process is therefore configured to check whether or not the second counter is above a threshold. In another possible implementation, once the second counter is above a threshold corresponding to a certain percentage of the first counter, the alert is generated. Once a new snapshot is taken, the second counter is reset to zero and the process begins again.

In some embodiments, generating an alert indicative of at least a potential ransomware attack on the storage system 105 based at least in part on the monitored differential satisfying one or more specified conditions comprises first generating an alert of a potential ransomware attack and subsequently initiating one or more attack remediation operations responsive to confirmation of the potential ransomware attack as an actual ransomware attack.

Illustrative embodiments are configured to take compressibility of the storage volume into account in generating the alert. For example, generating an alert indicative of at least a potential ransomware attack on the storage system 105 based at least in part on the monitored differential satisfying one or more specified conditions illustratively comprises determining that the monitored differential satisfies the one or more specified conditions, determining compressibility of at least a portion of the storage volume, and generating the alert responsive to the monitored differential satisfying the one or more specified conditions and the compressibility of the storage volume being below a specified level of compressibility.

The compressibility of at least a portion of the designated storage volume may be determined by collecting compressibility statistics for the storage volume as data is written to the storage volume.

In some embodiments, the storage controller 108 is configured to control deletion of one or more of the snapshots from the storage system 105 based at least in part on the generated alert. For example, the storage controller 108 is illustratively configured to determine that the generated alert is a false positive and to delete one or more of the snapshots from the storage system 105 based at least in part on the false positive determination. More particularly, in an embodiment in which only the two most recently generated snapshots are retained, the older of the two snapshots may be deleted.

The storage controller 108 is also configured to generate a message containing the generated alert, and possibly additional information characterizing the detected actual or potential attack, and to deliver the message over the network 104 to a storage administrator device which may comprise one of the host devices 102.

In some embodiments, the storage controller 108 is further configured to initiate restoration of the storage volume utilizing a selected one of the snapshots generated prior to the given snapshot based at least in part on the generated alert. Examples of arrangements of this type are described in more detail below in conjunction with FIGS. 2 and 3.

Various automated actions may be taken in at least one of the host devices 102 and the storage system 105 based at least in part on snapshots generated in the manner described above. For example, the snapshots are utilized in some embodiments to allow users of the storage system 105 to recover from data corruption by restoring one or more storage volumes using a previous PIT replica. Accordingly, one or more snapshots can be used to support automated rollback of a storage volume or set of storage volumes to a previous point in time.

As another example, snapshots may be used in conjunction with synchronous or asynchronous replication of data from the storage system 105 at a production site or datacenter to another storage system at a recovery site or datacenter, in order to support disaster recovery functionality.

The above-described operations carried out in conjunction with a process for snapshot-based detection and remediation of ransomware attacks in the storage system 105 are illustratively performed at least in part under the control of the ransomware detector 112. As is apparent from the foregoing description, such operations utilize the attack remediation control logic 114 as well as the snapshot generator 116.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for snapshot-based detection and remediation of ransomware attacks can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 2. The process as shown includes steps 200 through 216, and is suitable for use in system 100 but is more generally applicable to other types of information processing systems in which a storage system is configured to generate snapshots for one or more storage volumes and to take one or more automated actions based at least in part on the generated snapshots. The steps are illustratively performed at least in part under the control of the ransomware detector 112, attack remediation control logic 114 and snapshot generator 116 in the storage controller 108 of storage system 105 in system 100.

In step 200, at least one storage volume of the storage system is designated for ransomware attack detection and remediation. The designated storage volume is illustratively one of a plurality of logical storage volumes stored in the storage system, such as one of the storage volumes 110 of storage system 105. Multiple storage volumes can be designated for ransomware attack detection and remediation in step 200. For example, one or more sets of storage volumes each comprising a plurality of storage volumes can be designated. It will be assumed for clarity and simplicity of the following description that a single storage volume is designated, but the techniques described can be extended in a straightforward manner to multiple designated storage volumes as well as multiple sets of storage volumes.

In step 202, a snapshot of the storage volume is generated at a designated point in time in accordance with a predetermined schedule established for the storage volume. For example, the predetermined schedule may provide that snapshots are taken at each of a plurality of recurring intervals so as to produce a sequence of regularly-spaced snapshots over time. Such snapshots are illustratively generated utilizing a snapshot generator such as snapshot generator 116 in the storage controller 108. The storage system determines the particular ones of the snapshots of the sequence to retain in accordance with a snapshot retention policy and deletes any of the snapshots that are not retained. As will be described in more detail below, some embodiments retain only the two most recent snapshots.

Figure 2:
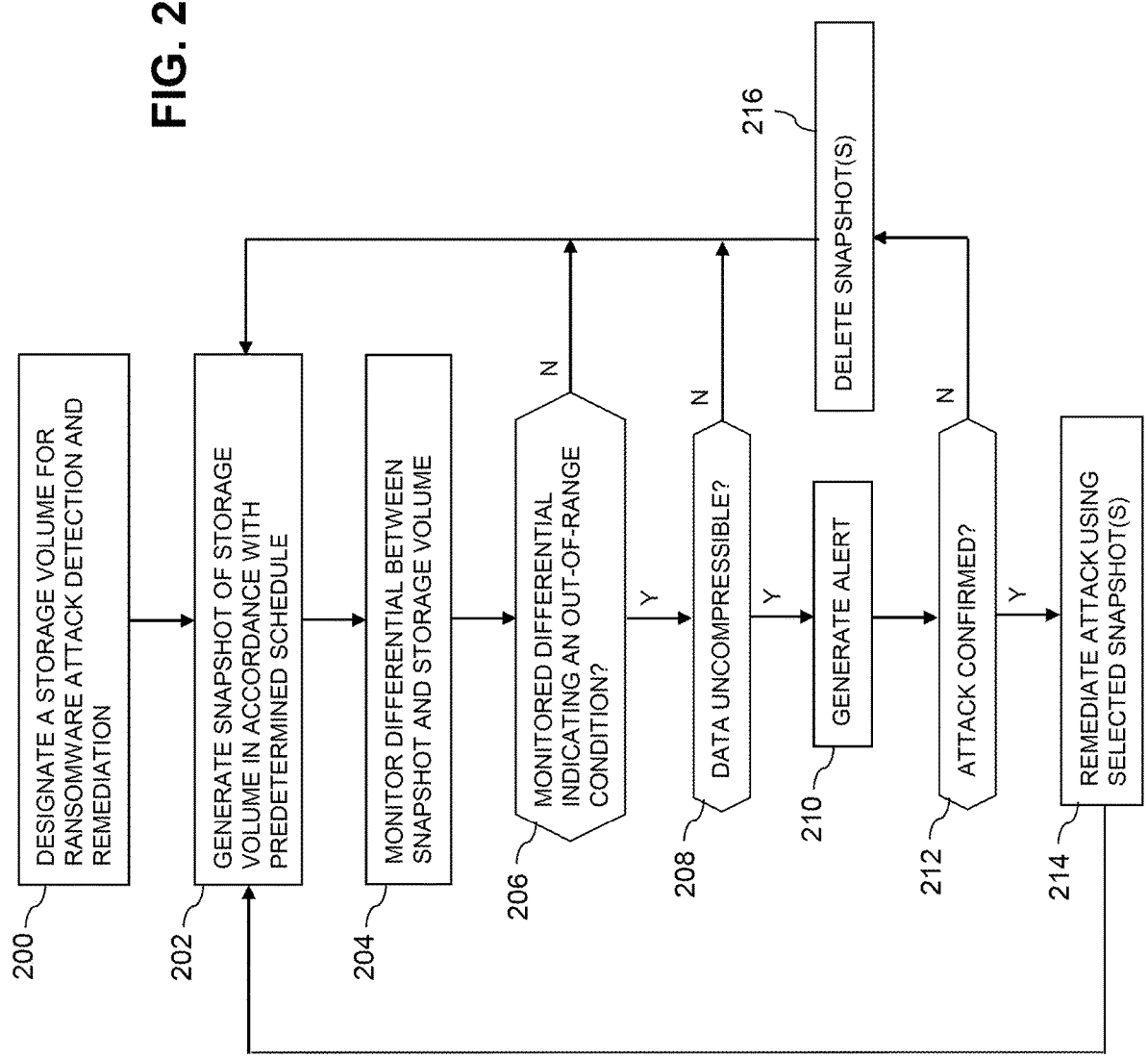
FIG. 2 is a flow diagram of a process for snapshot-based detection and remediation of ransomware attacks in an illustrative embodiment.
Figure 3:
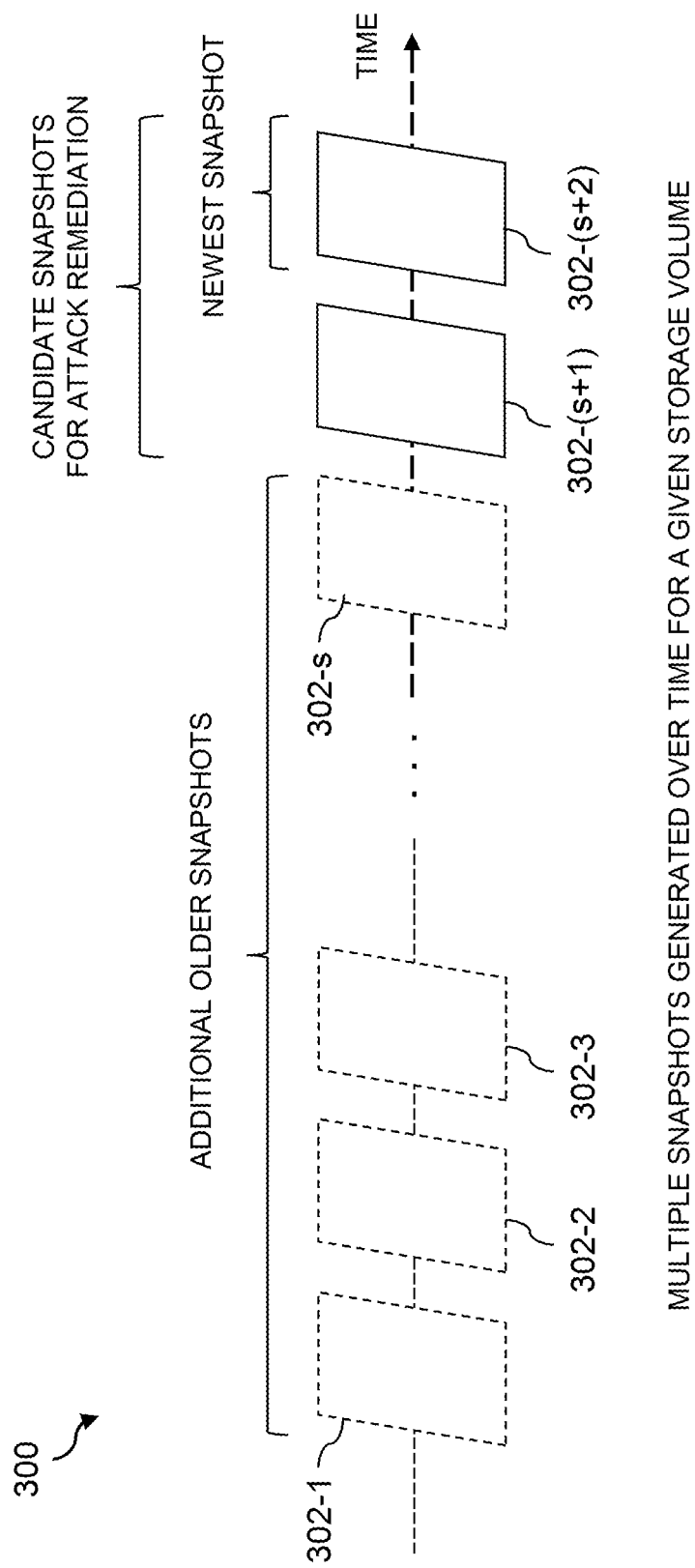
FIG. 3 shows an example of a sequence of snapshots generated in a storage system for use in implementing snapshot-based detection and remediation of ransomware attacks in an illustrative embodiment.

An example of a sequence of snapshots taken over time is shown in FIG. 3. In this embodiment, a sequence 300 of snapshots comprises a plurality of snapshots 302 in an order from an oldest snapshot to a newest snapshot. The snapshots 302 of sequence 300 more particularly comprise oldest snapshot 302-1, snapshot 302-2, snapshot 302-3, . . . snapshot 302-$s$, snapshot 302-($s$+1), and newest snapshot 302-($s$+2). The snapshots 302 illustratively comprise or otherwise correspond to respective PIT replicas of the storage volume generated at respective different points in time. The snapshots 302 of the sequence 300 are utilized in the FIG. 2 process to implement snapshot-based detection and remediation of ransomware attacks for one or more storage volumes of the storage system.

The snapshots in some embodiments are generated in accordance with a particular set time period having a low granularity (e.g., 5 minutes), although a wide variety of other arrangements can be used.

Two of the snapshots 302 of the sequence 300 including the newest snapshot 302-($s$+2) and the second newest snapshot 302-($s$+1) are denoted as candidate snapshots for use in attack remediation should an attack be detected using the FIG. 2 process. Additional older snapshots are shown in dashed outline in the figure but may have already been deleted by the storage system in accordance with a specified snapshot retention policy.

Illustrative embodiments generally retain at least two snapshots, including the newest snapshot and at least one additional snapshot that is prior in time to the newest snapshot and that like the newest snapshot also serves as a candidate snapshot for use in attack remediation. For example, just the two most recent snapshots may be retained. Alternatively, more than the two most recent snapshots may be retained. It is possible in other embodiments to retain just the newest snapshot for attack detection, although in such an embodiment there is no guarantee that an intact prior snapshot will be available for remediation.

The snapshots 302 generated for the storage volume in the FIG. 3 embodiment can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree is configured to add a new node each time a new snapshot of the sequence 300 is generated.

The term "snapshot" as used herein is intended to be broadly construed, and in some embodiments may encompass a complete PIT replica or other types of information characterizing the state of a given storage volume at a particular time.

Accordingly, the particular sequence 300 of snapshots shown in FIG. 3 is only an example, and should not be construed as limiting in any way. Alternative techniques can be used to generate other arrangements of snapshots for one or more storage volumes for use in detection and remediation of ransomware attacks as disclosed herein. Also, the snapshots need not be taken at regular intervals as illustrated in FIG. 3 but could instead be taken under other conditions specified in the storage system.

The remaining steps of the FIG. 2 process will now be described.

In step 204, a differential between the snapshot generated in step 202 and the storage volume is monitored. The snapshot for which the differential is monitored is illustratively the newest snapshot illustrated in the sequence 300 of FIG. 3, although it is possible that one or more differentials involving one or more other snapshots can be monitored in other embodiments.

In step 206, a determination is made as to whether or not the monitored differential indicates an out-of-range condition. Such an arrangement is an example of a determination as to whether or not the monitored differential satisfies the one or more specified conditions, with satisfaction of the one or more specified conditions indicating the out-of-range condition in this embodiment. The one or more specified conditions therefore comprise an out-of-range condition that if satisfied moves the process to step 208, and if not satisfied eventually returns the process to step 202 after expiration of a specified monitoring period. It is therefore assumed in the present embodiment that the monitoring referred to in steps 204 and 206 involves repeated rechecking or otherwise continues until such time as the out-of-range condition is met or the specified monitoring period expires. The specified monitoring period may correspond to a period of time that terminates at or near the time at which the next snapshot is to be generated in step 202.

As mentioned previously, the one or more specified conditions corresponding to the out-of-range condition of step 206 can comprise a specified minimum amount of change in the storage volume relative to the snapshot of the storage volume. Other examples of one or more specified conditions which when satisfied indicate an out-of-range condition in other embodiments include the monitored differential for the given snapshot exceeding a specified size, and monitored differentials for respective ones of the snapshots indicating a data change rate for the storage volume that exceeds a specified change rate. Numerous alternative conditions or combinations of multiple conditions can be used. Such conditions can relate to single snapshots, pairs of snapshots or other arrangements of snapshots.

In step 208, a determination is made as to whether or not the data of at least a portion of the storage volume is compressible. A ransomware attack generally involves encrypting data of the storage volume, which will render it uncompressible. This step therefore illustratively determines whether or not the data of at least a portion of the storage volume is below a specified minimum level of compressibility. Determining compressibility of at least a portion of the storage volume may comprise collecting compressibility statistics for the storage volume as data is written to the storage volume, although other techniques can be used. If the data is determined to uncompressible, the process moves to step 210, and otherwise the process eventually returns to step 202 for the generation of the next snapshot in accordance with the predetermined schedule. Like the determination performed in step 206 above, the determination in step 208 may be performed over a specified period of time that continues until such time as the data is determined to be uncompressible or the specified period expires.

In step 210, an alert is generated indicative of a potential ransomware attack on the storage system. The alert in this embodiment is generated responsive to the monitored differential satisfying the out-of-range condition in step 206 and the compressibility of the storage volume being below the specified minimum level of compressibility in step 208. Satisfaction of additional or alternative conditions may give rise to the generation of an alert of a potential or actual ransomware attack in other embodiments.

The term "alert" as used herein is intended to be broadly construed so as to encompass, for example, an alert of a potential attack, an alert of an actual attack, or a series of multiple separate alerts including a first alert of a potential attack followed by a second alert that the potential attack is an actual attack.

In step 212, a determination is made as to whether or not a potential attack indicated by the alert generated in step 210 has been confirmed as an actual attack. For example, various types of automated processing can be used to determine if an indicated potential attack is an actual attack. Additionally or alternatively, the alert of the potential attack can be sent to a storage administrator or other system user for confirmation. For example, the storage system can generate a message containing the generated alert as well as additional information regarding the detected potential ransomware attack and deliver the message over a network to a storage administrator device or other user device. The storage administrator or other system user can then utilize the information in the message to confirm the detected potential attack as an actual attack. Responsive to a confirmation that the potential attack is an actual attack, the process moves to step 214, and otherwise moves to step 216.

In step 214, the detected attack is an actual attack and one or more remediation operations are triggered to remediate the attack using one or more selected snapshots. For example, the storage volume may be automatically rolled back to the point in time associated with a particular selected candidate snapshot for attack remediation. In some embodiments, this is either the newest snapshot used to detect the ransomware attack or the snapshot generated just prior to the newest snapshot. Other older snapshots may also be used to the extent such snapshots have not already been deleted from the storage system in accordance with the snapshot retention policy. As mentioned previously, some embodiments retain just the two most recent snapshots of a snapshot sequence generated over time for a given storage volume.

In step 216, the potential ransomware attack is not confirmed as an actual ransomware attack, and so at least one of the candidate snapshots for attack remediation, and possibly one or more other snapshots, are deleted or designated for deletion. The process then returns to step 202 to generate the next snapshot in accordance with the predetermined schedule. This is an example of an arrangement in which the storage system controls deletion of one or more of the snapshots from the storage system based at least in part on a generated alert. In some situations, the storage system may determine that the alert generated in step 210 is a false positive and delete one or more of the snapshots from the storage system based at least in part on the false positive determination.

The FIG. 2 process allows the storage system to automatically detect a ransomware attack on a given storage volume, and further allows the storage volume to be rolled back to a particular prior point in time, automatically or with involvement of a storage administrator or other system user, in order to remediate the attack. This is achieved in illustrative embodiments utilizing only the two most recent snapshots, with rollback to a selected one of those snapshots in the event of an actual attack, although other arrangements of one or more snapshots can be used in other embodiments.

The FIG. 2 process continues for as long as the storage volume is designated for ransomware attack detection and remediation in the storage system. The process can be terminated under various conditions, possibly by or under the control of at least one of the ransomware detector 112 and the attack remediation control logic 114, such as a change in the designation previously made in step 200, a remapping, rezoning or other reconfiguration of one or more of the storage volumes 110 within the storage system 105, or deletion of the designated storage volume from the storage system 105.

The snapshots generated by a given storage system in conjunction with the FIG. 2 process may be utilized to perform one or more automated actions in the storage system. For example, the storage system may utilize one or more snapshots to support automated rollback of a storage volume or set of storage volumes to a previous point in time, or to perform synchronous or asynchronous replication of data of one or more storage volumes from the storage system to another storage system or to another portion of the same storage system. These and numerous other automated actions may be taken utilizing snapshots generated in a given storage system in conjunction with the FIG. 2 process.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for snapshot-based detection and remediation of ransomware attacks. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different snapshot-based detection and remediation processes for respective different sets of one or more storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 of storage system 105 that is configured to control performance of one or more steps of the FIG. 2 process in the system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate snapshot-based detection and remediation techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The storage controller 408 in the present embodiment is configured to implement ransomware attack detection and remediation functionality of the type previously described in conjunction with FIGS. 1 through 3. The content addressable storage system 405 may be viewed as representing an illustrative embodiment of the storage system 105 of system 100 in FIG. 1, although as previously noted other types of storage systems can be used.

The storage controller 408 includes distributed modules 412, 414 and 416, which are configured to operate in a manner similar to that described above for respective corresponding ransomware detector 112, attack remediation control logic 114 and snapshot generator 116 of the storage controller 108 of storage system 105 in system 100.

Module 412 is more particularly referred to as a distributed ransomware detector, and illustratively comprises multiple ransomware detection instances on respective ones of a plurality of distinct nodes. Similarly, module 414 is more particularly referred to as distributed attack remediation control logic, and illustratively comprises multiple attack remediation control logic instances on respective ones of the distinct nodes, and module 416 is more particularly referred to as a distributed snapshot generator, and illustratively comprises multiple snapshot generation instances on respective ones of the distinct nodes.

Figure 4:
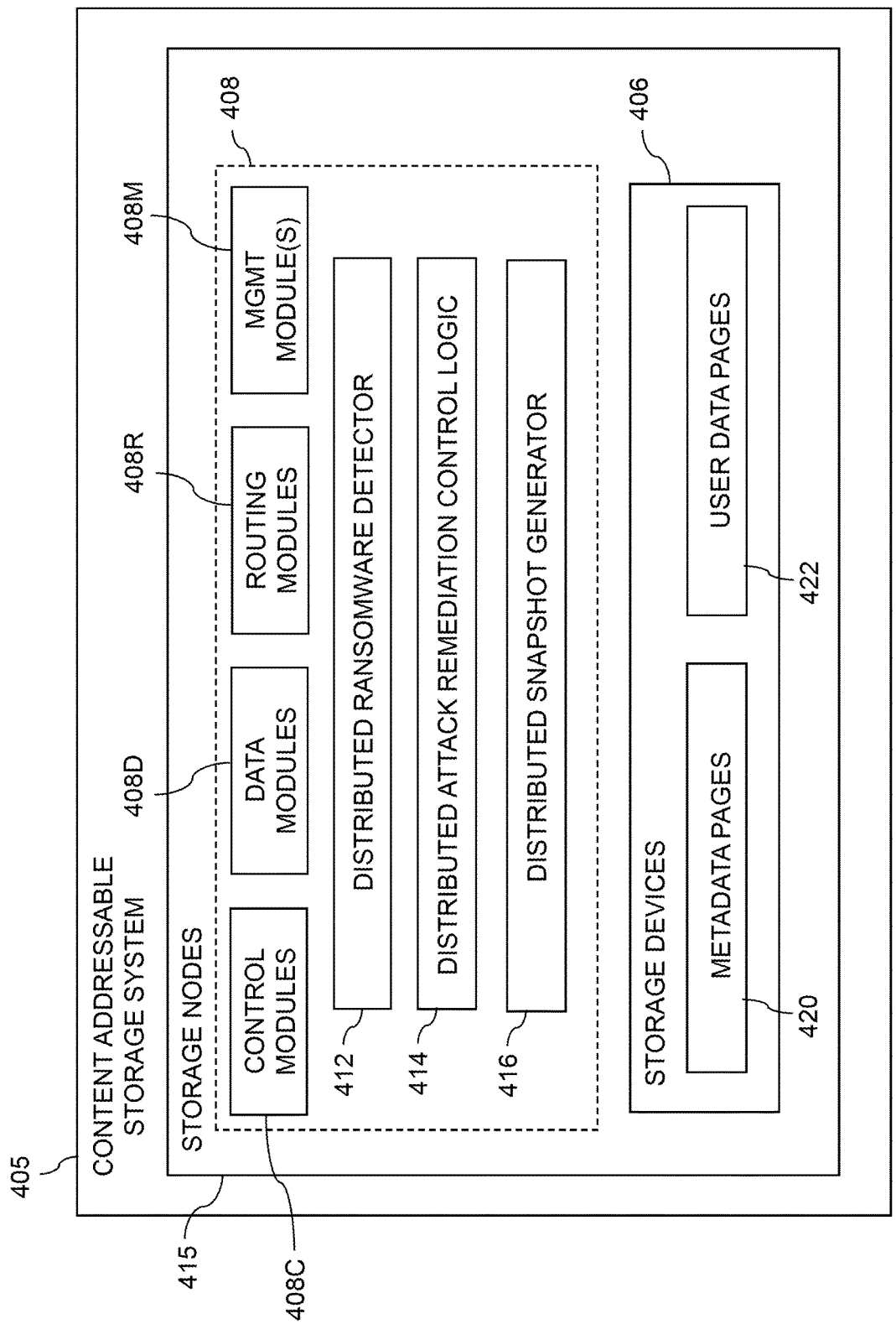
FIG. 4 shows a content addressable storage system having a distributed storage controller configured with functionality for snapshot-based detection and remediation of ransomware attacks in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412, 414 and 416 in the present embodiment are assumed to be distributed at least in part over at least a subset of the other modules 408C, 408D, 408R and 408M of the storage controller 408. Accordingly, at least portions of the ransomware attack detection and remediation functionality of the modules 412, 414 and 416 may be implemented in one or more of the other modules of the storage controller 408. In other embodiments, the modules 412, 414 and 416 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which storage volume snapshots are stored in a tree structure using modules 412, 414 and 416 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The ransomware attack detection and remediation functionality provided by modules 412, 414 and 416 in this embodiment is assumed to be distributed across multiple distributed processing modules, including at least a subset of the processing modules 408C, 408D, 408R and 408M of the distributed storage controller 408.

For example, the management module 408M of the storage controller 408 may include ransomware detection and remediation instances that engage corresponding ransomware detection and remediation instances in all of the control modules 408C and routing modules 408R in order to implement a ransomware detection and remediation process.

In some embodiments, the content addressable storage system 405 comprises an XtremIO™ storage array suitably modified to incorporate techniques for snapshot-based detection and remediation of ransomware attacks as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, ransomware attack detection and remediation functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement ransomware attack detection and remediation functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with ransomware attack detection and remediation functionality as disclosed herein can provide a number of significant advantages relative to conventional arrangements.

For example, some embodiments are advantageously configured to provide particularly accurate and efficient detection of an on-going ransomware attack directly on a storage array or other type of storage system through monitoring of differentials between snapshots and respective sets of one or more storage volumes.

Illustrative embodiments can also facilitate automated ransomware attack remediation through selection of a particular one of the snapshots for use in data recovery responsive to detection of an actual attack.

These and other embodiments can significantly reduce the amount of time required to detect an on-going ransomware attack, thereby substantially reducing the number of files that are encrypted by the attack, and alleviating the adverse impact of the attack on the victim. Moreover, automated rollback using the most appropriate snapshot is advantageously provided in some embodiments.

Some embodiments therefore utilize a sequence of snapshots to facilitate both ransomware attack detection and remediation. For example, a storage system configured in accordance with the techniques disclosed herein can easily determine the most recent snapshot that is unaffected by a detected attack, such that the storage volume can be rolled back to the point in time corresponding to that snapshot. Such arrangements avoid considerable difficulties that might otherwise be associated with attack remediation. For example, only a very small number of snapshots need be retained for a given storage volume in order to support detection and remediation. There is no need to retain an excessive number of snapshots, and the complexity of determining which of those many snapshots should be used for remediation is eliminated.

A given storage system in an illustrative embodiment can therefore provide effective detection of a ransomware attack while also providing a storage administrator with a simple path to full remediation.

Functionality for snapshot-based detection and remediation of ransomware attacks can be implemented in a storage system, in a host device, or partially in a storage system and partially in a host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with ransomware attack detection and remediation functionality will now be described in greater detail with reference to FIGS. 5 and 6. Although described in the context of system 100, these platforms may also be used to implement at least portions of other information processing systems in other embodiments.

Figure 5:
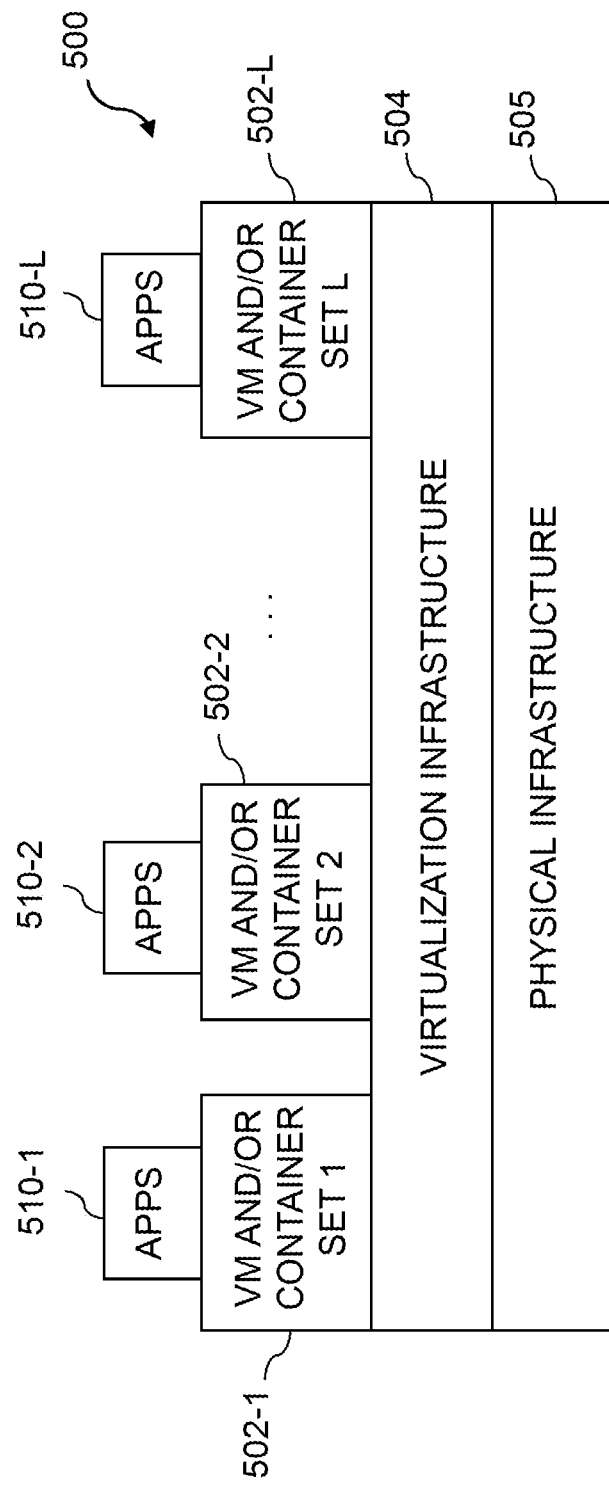
FIGS. 5 and 6 show examples of processing platforms that may be utilized to implement at least a portion of an information processing system in illustrative embodiments.
Figure 6:
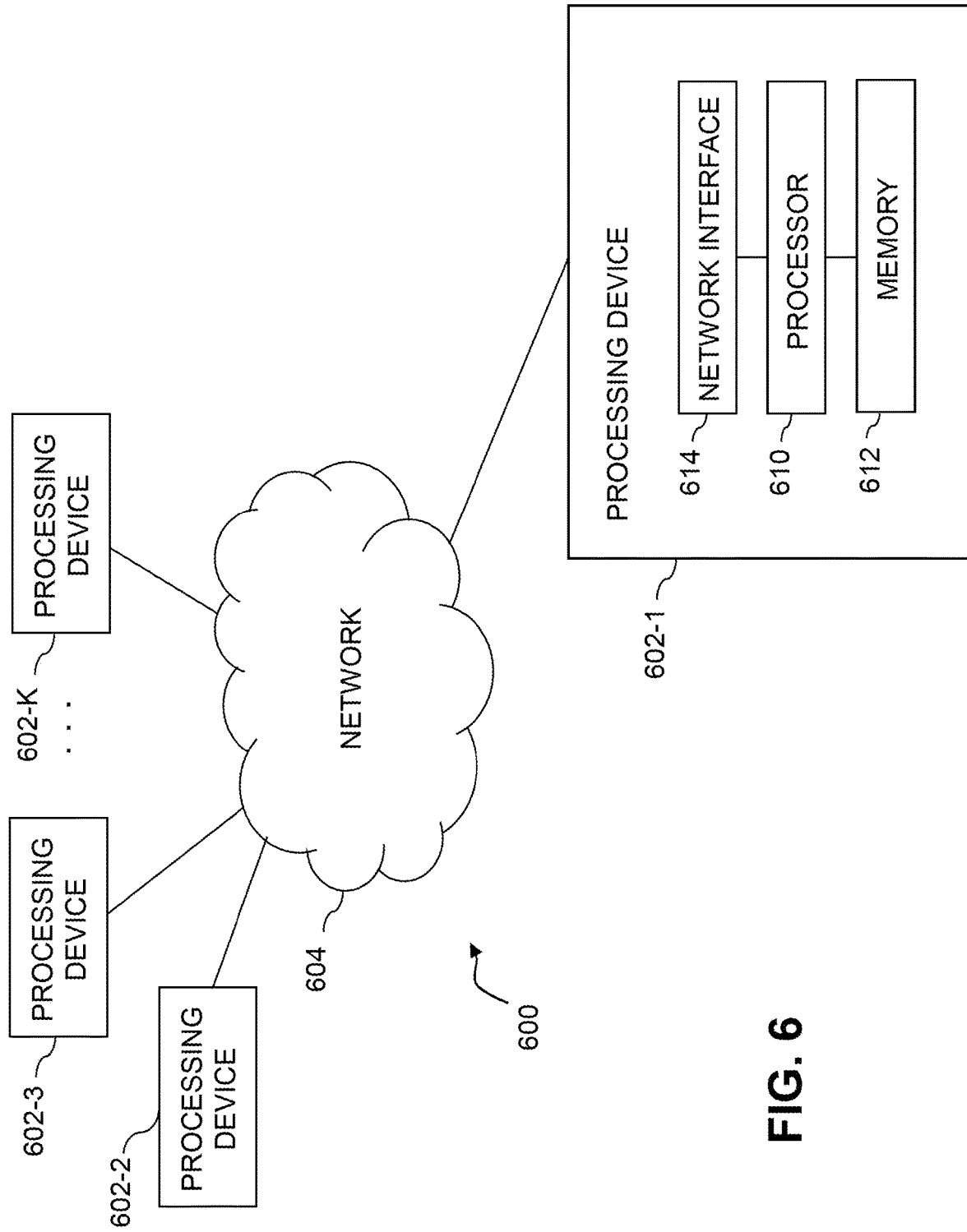

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide ransomware attack detection and remediation functionality of the type described above for one or more processes running on a given one of the VMs. For example, each of the VMs can implement ransomware attack detection and remediation modules and associated snapshot generators for providing ransomware attack detection and remediation functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide ransomware attack detection and remediation functionality of the type described above. For example, a container host device supporting multiple containers of one or more container sets can implement ransomware attack detection and remediation modules and associated snapshot generators for providing ransomware attack detection and remediation functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the ransomware attack detection and remediation functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, ransomware attack detection and remediation processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage controller being configured:
to generate a plurality of snapshots of a storage volume of the storage system at respective different points in time;
to monitor a differential between a given one of the snapshots and a current version of the storage volume; and
to generate an alert indicative of at least a potential ransomware attack on the storage system based at least in part on the monitored differential satisfying one or more specified conditions, the potential ransomware attack comprising a suspected ransomware attack not yet confirmed as an actual ransomware attack;
wherein generating an alert indicative of at least a potential ransomware attack on the storage system based at least in part on the monitored differential satisfying one or more specified conditions comprises:
determining that the monitored differential satisfies the one or more specified conditions;
determining compressibility of at least a portion of the storage volume; and
generating the alert responsive to the monitored differential satisfying the one or more specified conditions and the compressibility of the storage volume being below a specified level of compressibility, the specified level of compressibility being based at least in part on a minimum compressibility achievable for said at least a portion of the storage volume;
wherein determining compressibility of at least a portion of the storage volume comprises collecting compressibility statistics for the storage volume as data is written to the storage volume; and
wherein the storage controller comprises at least one processing device comprising a processor coupled to a memory.

2. The apparatus of claim 1 wherein the storage volume comprises at least one logical storage volume comprising at least a portion of a physical storage space of one or more of the storage devices.

3. The apparatus of claim 1 wherein at least a subset of the snapshots comprise respective point-in-time replicas of the storage volume generated at respective different points in time.

4. The apparatus of claim 1 wherein only two most recently generated snapshots for the storage volume are retained in the storage system.

5. The apparatus of claim 1 wherein the one or more specified conditions comprise a specified minimum amount of change in the storage volume relative to the given snapshot of the storage volume.

6. The apparatus of claim 5 wherein the specified minimum amount of change in the storage volume is specified in terms of a minimum number of storage units of the storage volume that have changed since generation of the given snapshot.

7. The apparatus of claim 5 wherein the specified minimum amount of change in the storage volume is specified in terms of a minimum percentage of the storage volume that has changed since generation of the given snapshot.

8. The apparatus of claim 1 wherein generating an alert indicative of at least a potential ransomware attack on the storage system based at least in part on the monitored differential satisfying one or more specified conditions comprises generating an alert of a potential ransomware attack and initiating one or more attack remediation operations responsive to confirmation of the potential ransomware attack as an actual ransomware attack.

9. The apparatus of claim 1 wherein the storage controller is configured to control deletion of one or more of the snapshots from the storage system based at least in part on the generated alert.

10. The apparatus of claim 1 wherein the storage controller is configured to determine that the generated alert is a false positive and to delete one or more of the snapshots from the storage system based at least in part on the false positive determination.

11. The apparatus of claim 1 wherein the storage controller is further configured to generate a message containing the generated alert and to deliver the message over a network to a storage administrator device.

12. The apparatus of claim 1 wherein the storage controller is further configured to initiate restoration of the storage volume utilizing a selected one of the snapshots generated prior to the given snapshot based at least in part on the generated alert.

13. A method comprising:

generating a plurality of snapshots of a storage volume of a storage system at respective different points in time;

monitoring a differential between a given one of the snapshots and a current version of the storage volume; and generating an alert indicative of at least a potential ransomware attack on the storage system based at least in part on the monitored differential satisfying one or more specified conditions, the potential ransomware attack comprising a suspected ransomware attack not yet confirmed as an actual ransomware attack;

wherein generating an alert indicative of at least a potential ransomware attack on the storage system based at least in part on the monitored differential satisfying one or more specified conditions comprises:

determining that the monitored differential satisfies the one or more specified conditions;

determining compressibility of at least a portion of the storage volume; and generating the alert responsive to the monitored differential satisfying the one or more specified conditions and the compressibility of the storage volume being below a specified level of compressibility, the specified level of compressibility being based at least in part on a minimum compressibility achievable for said at least a portion of the storage volume;

wherein determining compressibility of at least a portion of the storage volume comprises collecting compressibility statistics for the storage volume as data is written to the storage volume; and wherein the method is implemented by at least one processing device comprising a processor coupled to a memory.

14. The method of claim 13 wherein the one or more specified conditions comprise a specified minimum amount of change in the storage volume relative to the given snapshot of the storage volume.

15. A computer program product comprising a non-transitory processor-readable storage medium having stored therein program code of one or more software programs, wherein the program code when executed by at least one processing device causes said at least one processing device:

to generate a plurality of snapshots of a storage volume of a storage system at respective different points in time;

to monitor a differential between a given one of the snapshots and a current version of the storage volume; and to generate an alert indicative of at least a potential ransomware attack on the storage system based at least in part on the monitored differential satisfying one or more specified conditions, the potential ransomware attack comprising a suspected ransomware attack not yet confirmed as an actual ransomware attack;

wherein generating an alert indicative of at least a potential ransomware attack on the storage system based at least in part on the monitored differential satisfying one or more specified conditions comprises:

determining that the monitored differential satisfies the one or more specified conditions;

determining compressibility of at least a portion of the storage volume; and generating the alert responsive to the monitored differential satisfying the one or more specified conditions and the compressibility of the storage volume being below a specified level of compressibility, the specified level of compressibility being based at least in part on a minimum compressibility achievable for said at least a portion of the storage volume; and wherein determining compressibility of at least a portion of the storage volume comprises collecting compressibility statistics for the storage volume as data is written to the storage volume.

16. The computer program product of claim 15 wherein the one or more specified conditions comprise a specified minimum amount of change in the storage volume relative to the given snapshot of the storage volume.

17. The computer program product of claim 16 wherein the specified minimum amount of change in the storage volume is specified in terms of a minimum number of storage units of the storage volume that have changed since generation of the given snapshot.

18. The computer program product of claim 16 wherein the specified minimum amount of change in the storage volume is specified in terms of a minimum percentage of the storage volume that has changed since generation of the given snapshot.

19. The computer program product of claim 15 wherein generating an alert indicative of at least a potential ransomware attack on the storage system based at least in part on the monitored differential satisfying one or more specified conditions comprises generating an alert of a potential ransomware attack and initiating one or more attack remediation operations responsive to confirmation of the potential ransomware attack as an actual ransomware attack.

20. The computer program product of claim 15 wherein the program code when executed by said at least one processing device further causes said at least one processing device to determine that the generated alert is a false positive and to delete one or more of the snapshots from the storage system based at least in part on the false positive determination.

* * * * *